(12) United States Patent
Bereznai

(10) Patent No.: US 8,230,884 B2
(45) Date of Patent: Jul. 31, 2012

(54) CONTROL VALVE WITH PROFILED PACKING ELEMENT

(75) Inventor: Jozsef Bereznai, Budapest (HU)

(73) Assignee: Bery Intellectual Properties Szellemi Tulajdonjogokat Hasznosito es Kezelo Korlatolt Felelossegu Tasaasag, Budapest (HU)

( * ) Notice: Subject to any disclaimer, the term of this patent is extended or adjusted under 35 U.S.C. 154(b) by 929 days.

(21) Appl. No.: 12/282,868

(22) PCT Filed: Mar. 12, 2007

(86) PCT No.: PCT/HU2007/000023
§ 371 (c)(1),
(2), (4) Date: Oct. 14, 2008

(87) PCT Pub. No.: WO2007/105020
PCT Pub. Date: Sep. 20, 2007

(65) Prior Publication Data
US 2009/0166575 A1 Jul. 2, 2009

(30) Foreign Application Priority Data

Mar. 13, 2006 (HU) .................................... 0600201

(51) Int. Cl.
*F15D 1/04* (2006.01)
(52) U.S. Cl. .......... 138/46; 138/45; 239/428.5; 137/860
(58) Field of Classification Search .................... 138/45, 138/46; 239/428.5; 137/860
See application file for complete search history.

(56) References Cited

U.S. PATENT DOCUMENTS

| | | | | |
|---|---|---|---|---|
| 2,614,793 A | * | 10/1952 | Storm | 137/860 |
| 2,731,299 A | | 1/1956 | Bramming | |
| 3,409,050 A | * | 11/1968 | Weese | 138/45 |
| 3,561,472 A | | 2/1971 | Lamb et al. | |
| 3,630,455 A | * | 12/1971 | Parkison | 239/533.14 |
| 3,910,306 A | | 10/1975 | Ohrn | |
| 4,000,857 A | * | 1/1977 | Moen | 239/428.5 |
| 4,344,459 A | * | 8/1982 | Nelson | 138/45 |
| 4,424,936 A | * | 1/1984 | Marc | 239/271 |
| 4,541,815 A | | 9/1985 | Lee et al. | |
| 4,562,960 A | * | 1/1986 | Marty et al. | 239/72 |
| 6,571,831 B1 | * | 6/2003 | Hart | 138/46 |

FOREIGN PATENT DOCUMENTS

CH        543024 A    11/1973

(Continued)

*Primary Examiner* — Patrick F Brinson
(74) *Attorney, Agent, or Firm* — Birch, Stewart, Kolasch & Birch, LLP

(57) ABSTRACT

Control valve with profiled packing element for making bidirectional flow-through with asymmetric intensity possible in a flow area. The packing element (1) has a first surface which can be abutted against a second surface in the valve housing (2). The packing element (1) has a first position in which said first surface (3) and said second surface (4) abut against one another, and a second position in which said first surface (3) and said second surface (4) are distant from one another. At least one of the surfaces (3, 4) is provided with a damage (5) by means of which when said packing element (1) is in its first position a first cross-section of flow is ensured between said abutting first and second surfaces (3, 4), which is smaller than a second cross-section of flow ensured by said packing element (1) when it is in its second position.

8 Claims, 7 Drawing Sheets

FOREIGN PATENT DOCUMENTS

Figure 6A:
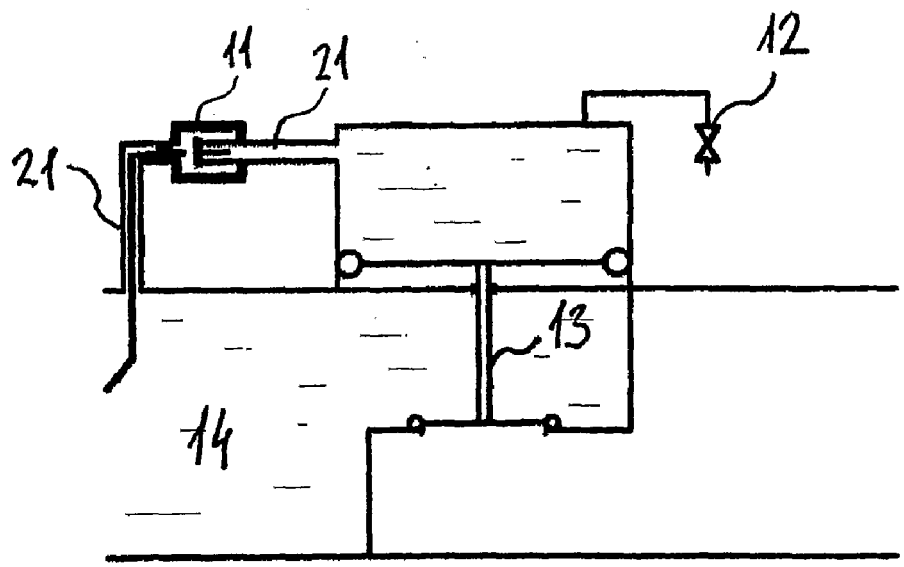

| | | | |
|---|---|---|---|
| DE | 3737437 A1 | 5/1988 |
| DE | 19729777 A1 | 2/1999 |
| EP | 1106884 A2 | 6/2001 |
| JP | 61294279 A | 12/1986 |
| SU | 422905 | 4/1974 |
| SU | 422905 A | 9/1974 |

* cited by examiner

Fig. 1A
Fig. 1B
Fig. 1C
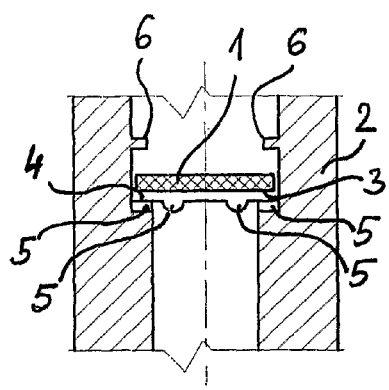
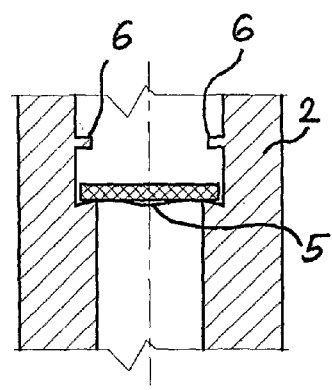
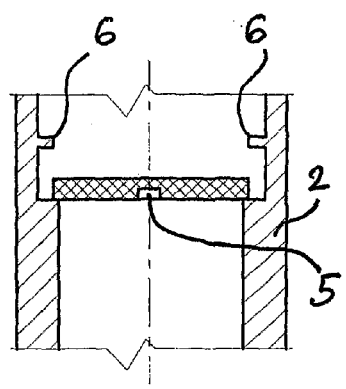
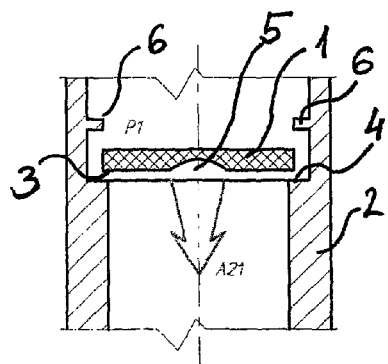
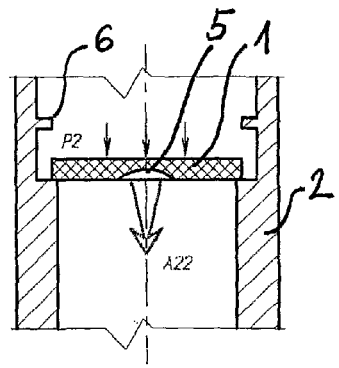
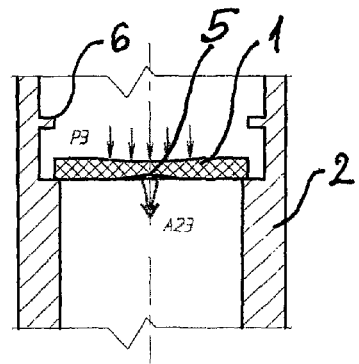
P1 < P2 < P3
A21 > A22 > A23
Fig. 2A
Fig. 2B
Fig. 2C Fig 3A.
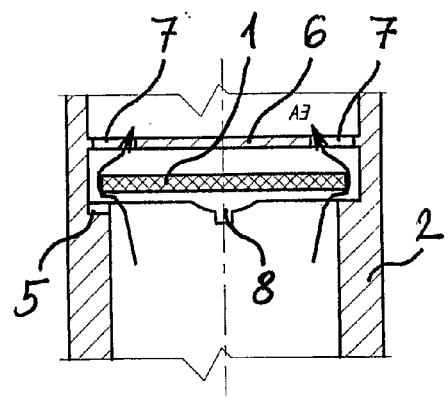
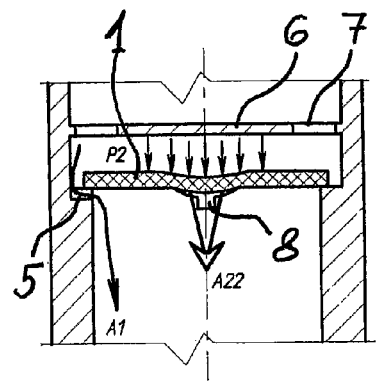
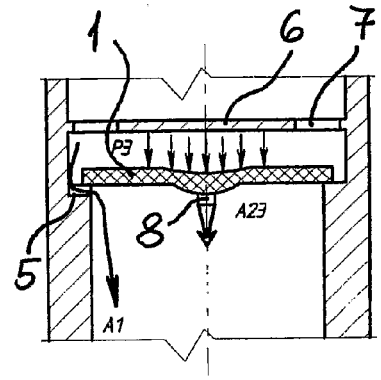
Fig. 3B
Fig. 3C
Fig. 3D

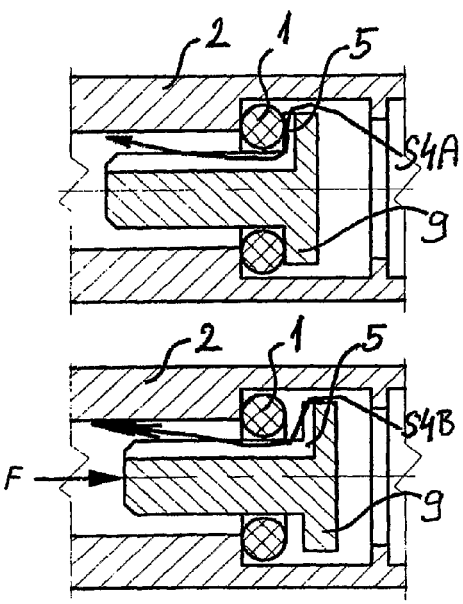
Fig. 4A
Fig. 4B
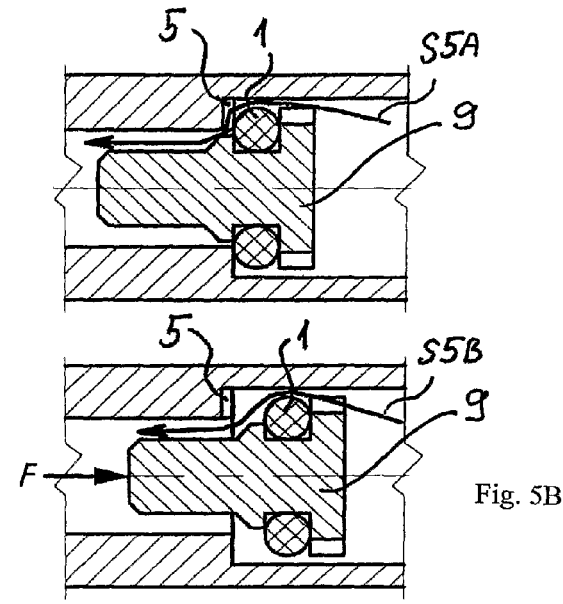
Fig. 5A
Fig. 5B
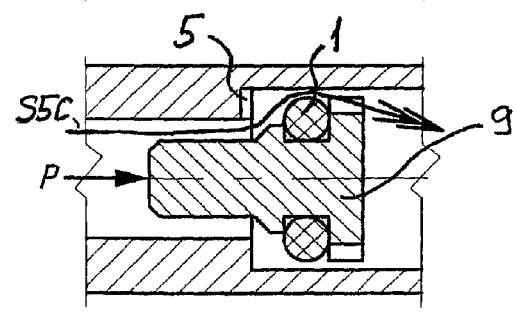
Fig. 5C

Fig. 7A
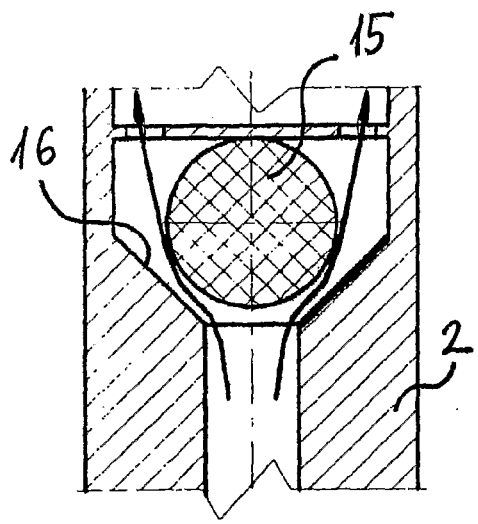
Fig. 7B
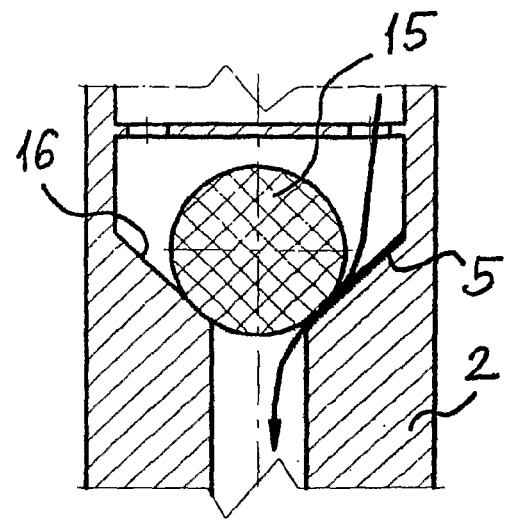
Fig. 9
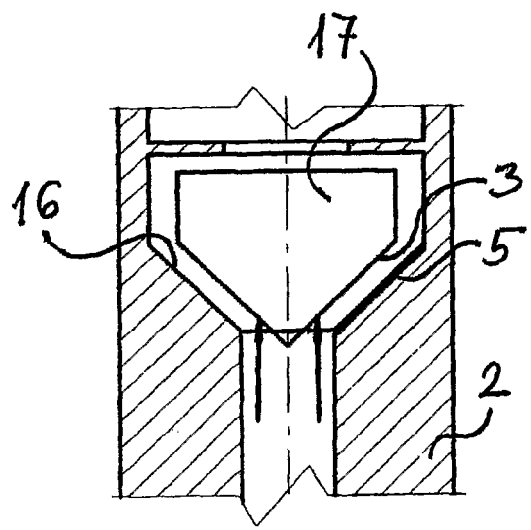
Fig. 8A
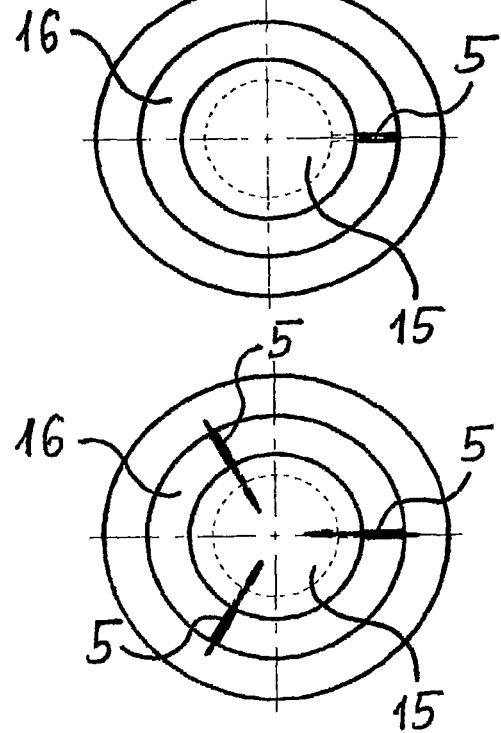
Fig. 8B Fig. 10A
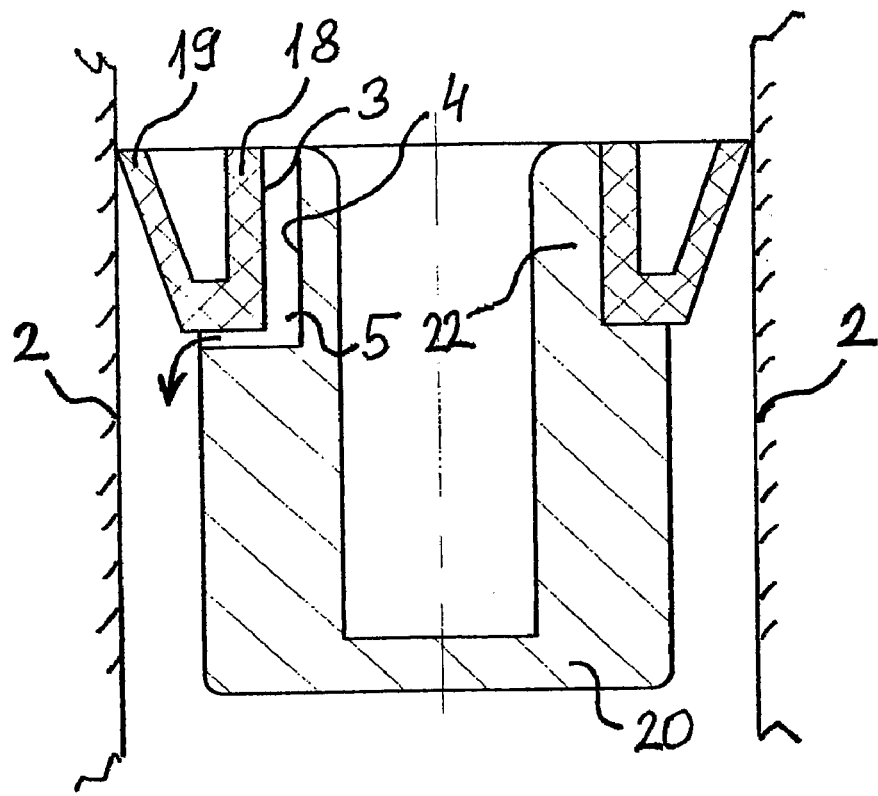
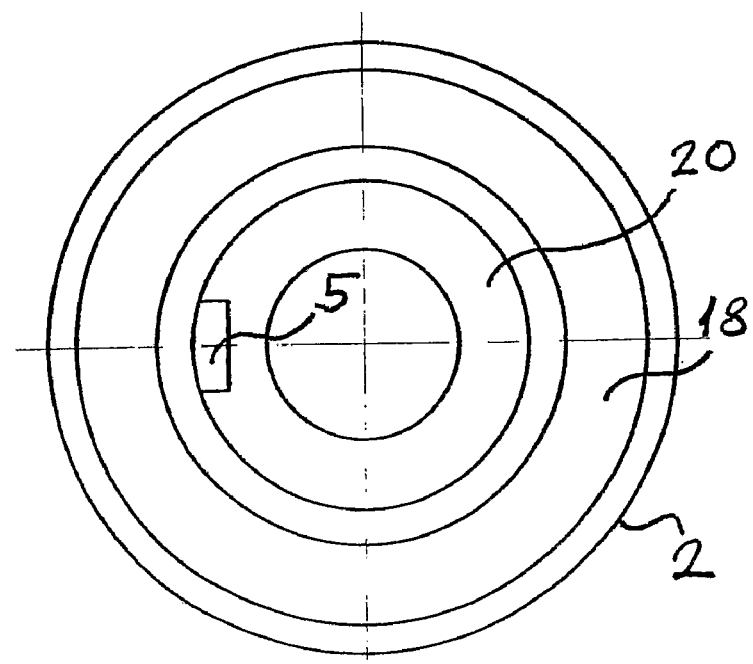
Fig. 10B

CONTROL VALVE WITH PROFILED PACKING ELEMENT

This Application is the National Phase Under 35 U.S.C. §371 of PCT International Application No. PCT/HU2007/000023 which has an International filing date of Mar. 13, 2007, which claims priority to Hungary Application No. P0600201 filed on Mar. 13, 2006. The entire contents of all applications listed above are hereby incorporated by reference.

The invention relates to an arrangement composed of a first and a second surface for closing which is adapted for use in control valves as well as control valves of this type. Particularly, the invention relates to a control valve with profiled packing element for making bidirectional flow-through with asymmetric intensity possible in a flow area, wherein the packing element is provided with a first surface which can be abutted against a second surface formed in the valve housing. Naturally, this asymmetric flow velocity when employed e.g. in a system of pistons is able to control the movement and the velocity of movement of the components connected to the piston e.g. closing elements, arresters, shock absorbers.

Solutions are known which are adapted to control fluid material flow by means of abutting surface pairs, which on the one hand prevent the flow area from getting clogged by the dirt being present in the flowing material, on the other hand they ensure controlling and feeding of the flow of liquid or gaseous material according to specific timing or other time-variable control. U.S. Pat. No. 7,175,154 (based on Hungarian patent application P0104144) discloses a solution for such feeding. A solution of similar purpose is proposed in U.S. Pat. No. 7,175,154, in which a pair of abutting surfaces made of hard and elastic material are used for piston packing. The inventor of the above mentioned documents is the same as that of the present invention.

According to the second solution referred above a surface of the surface pairs is formed from an elastic material, the other surface is formed from a hard material. At least one of the surfaces is provided with e.g. grooves, recesses, notches, channels, etching, roughening or combination of them for ensuring flow-through by means of which the problem of control set in U.S. Pat. No. 7,175,154 can be solved.

Still, there is a disadvantage of this solution, since the elastic and hard joining surface pair is intended mainly to use for pistons and as such it requires an unnecessarily complicated structure. Therefore a solution is needed in which bidirectional flow-through can be controlled without a piston. This is needed for example in case of arrangements intended for solving timing or feeding problems. According to this, a first and a second surfaces abutting against one another are used for closing wherein at least one of the surfaces is formed with a damage which when the surfaces are lying on one another in a first state ensures orders of magnitude less but well defined flow-through of material as compared to an open second state when the surfaces do not abut against one another. It has been realized that structures of this type can be embodied by means of a profiled packing element the movement of which is limited.

The control valve to this end is a control means which makes bidirectional asymmetric flow-through of liquids possible, having a suitable profiled packing element and communicates with the inlet end and outlet end of the flow area to be controlled. The material flowing in the flow area is either liquid or gaseous.

The profiled packing element is located in a closed space where its movement is limited. This closed space may have a form of various geometric bodies, e.g. it can be cylindrical, cone-shaped or may have other shapes. The profiled packing element can move between a first and a second position within this space. In its first position the packing element abuts against a surface in the valve housing. Hereinafter this surface is referred to as second surface. These first and second surfaces are substantially flat or at least smooth surfaces. Further, one or more damages are formed at least on one of the surfaces ensuring a negligibly small flow area even in case of the first position. This is referred to as first cross-section of flow.

Damage in this context may be e.g. a groove, a recess, a notch, a channel, etching, roughening or combination of them as mentioned earlier. It is formed in a flat or smooth surface, however, it is possible that an originally rough or roughened surface ensures the first cross-section of flow.

When the profiled packing element due to the forces acting on it (e.g. pressure difference) moves from its first position, it gets into a second position as specified by the confined space. In this second position the flow path (previously having a first flow area) becomes free, i.e. the flow area is increased to an extent correspondent to a second cross-section of flow which makes free flow-through possible. The second cross-section of flow is many times, preferably orders of magnitude larger than the first cross-section of flow. The latter is advantageous in the case when remarkably different periods or material quantities are to be determined within an operating cycle, for example in case of shock absorbers, movement and speed governors, door controls, damping devices, water tanks for toilets, push-button faucets, other liquid feeders and control valves.

In case of liquid feeding valves operating cycle means the proportioning of one dosage of the liquid, while in case of shock absorbers, door controls and the like operating cycle means the process till the initial position is first regained.

In known solutions where the small sized ducts for material flow-through are narrow bore-holes, especially when the material flow in the given bore-hole is unidirectional, the ducts get clogged inevitably because of the solid contamination unavoidably being present. Further, if clogging occurred, cleaning of the narrow bore-holes is very complicated. Therefore possibility for self-cleaning and/or easy maintenance is required.

As opposed to known solutions the small sized ducts according to the invention are formed from two close-fitting halves so that these halves open out during each operating cycle, i.e. the packing element forming one of the halves takes up both its first and second positions. The open second position provides for extensive flow-through within a cycle. It is replaceable if the control valve according to the invention contains an additional one-way valve which is arranged parallel with the first cross-section of flow ensured by the packing element. Then during the operating cycles of the control valve, depending on the direction of flow, either a nearly entirely closed state or a third cross-section of flow is ensured, the third cross-section of flow being orders of magnitude larger then the first cross-section of flow. In this case the packing element takes up only its first position for ensuring the first cross-section of flow, the halves forming the boundary of the narrow ducts do not open out thereby the flow can not wash away the possibly stuck contamination. Then one of the halves, referred to as packing element, can be brought to its second position by a maintenance means or equipment. This can be a mechanical spring means which when pushed detaches the packing element from the other half forming the second surface, and after releasing it the packing element returns to its closed first position.

If the packing element is made of an elastic material then the first cross-section of flow may be varied by the external (both sides) pressure conditions. This is because the elastic packing element is pressed in the associated abutting hard surface to an extent which is proportional to the pressure difference between the two sides of the elastic packing element. Accordingly, the elastic packing element may be suitably adapted for certain control tasks. To this end the damages must be suitably sized and shaped. Damages may be formed in the elastic material of the packing element, i.e. the first surface, and/or in the hard second surface.

It must be noted that the force acting on the packing element is influenced not only by the pressure difference between its two sides, but other factors may also have an effect on it. If the inlet space and the outlet space is closed by the packing element, the pressure in them may be different. To define the vectorial resultant force acting on the packing element the pressure on the given sides is multiplied with the size of the associated surfaces of the packing element.

Further, the packing element or a component part which is mechanically built in may be provided with an external means (e.g. spring) the force of which is added to the force resulting from the pressure and surface. Further, it can be set into operation manually or mechanically by means of an external element, which may for example be a push button or a mechanical operating element, rod for example in case of feeder valves.

The profiled packing element may have e.g. a simple flat format made of elastic material for example rubber or plastic, or even hard, for example ceramic material. The material of the second surface formed in the valve housing may be metal, ceramic, plastic or other material. The damage according to the invention is provided at least in one of these surfaces. The damages may be formed on the second surface in the valve housing or in the surface of the profiled packing element being in connection with the second surface, i.e. in the first surface. The damage may be formed as a groove, recess, notch, channel, etching, structured rough surface, etc. The main point is that a suitable controlled cross-section of flow must be ensured. Naturally, damages may be formed also in the profiled packing element. If damages are present in both surfaces, then the cross-section of flow may be controlled for example depending on the flow velocity. For example transversal damages cause turbulence or whirling at higher flow velocity. This after all means that the available amount of flow-through is non-linearly proportional to the pressure difference between the two sides.

Further, the profiled packing element may be disc-shaped or even prism-shaped which is placed in a space ensuring its displacement in a predetermined extent. Then the flow paths created around the packing element being in its second position make substantially unhampered flow-through possible.

Further, the profiled packing element may also be ball-shaped. Preferably, in this case the first abutting surface is funnel-shaped for receiving the second abutting surface of the ball-shaped packing element ensuring centralized position of it and also ensuring a symmetric flow area when the ball-shaped packing element moves to its second position. Alternatively the ball-shaped packing element may be replaced by a cone-shaped body.

The mentioned control valve provided with abutting surfaces may also be located outside the main flow path or distant from the elements controlling the material flow. Connection between the control valve and the elements controlling the flow can be ensured through ducts which are much thinner than the main flow path, i.e. the control valve can be installed as a parallel branch connected to connecting points of the elements controlling the main flow. Thereby the control function may be separated from the main function ensuring the effective cross-section of flow.

The control valve ensuring bidirectional asymmetric flow-through according to the invention may be placed in the main flow path as a smaller, replaceable element thereof, for example it may be placed in a bore-hole of a relatively larger piston (membrane, closing element). In this case the small control valve can be replaced instead of the entire piston (membrane, closing element). This solution is advantageous for example in case of shock absorbers, industrial valves.

It must be noted that control valves of this type irrespective of their location are always able to take up two different positions one ensuring a substantially smaller cross-section of flow then the other. Simultaneously, the directions of flow are also different. The effect of this is that when the abutting surfaces open out either during an operating cycle or maintenance, the contamination possibly stuck in the state of the smaller cross-section are being removed in the second position, particularly when the direction of flow changes. Thereby the valve is made self-cleaning.

Figure 6B:
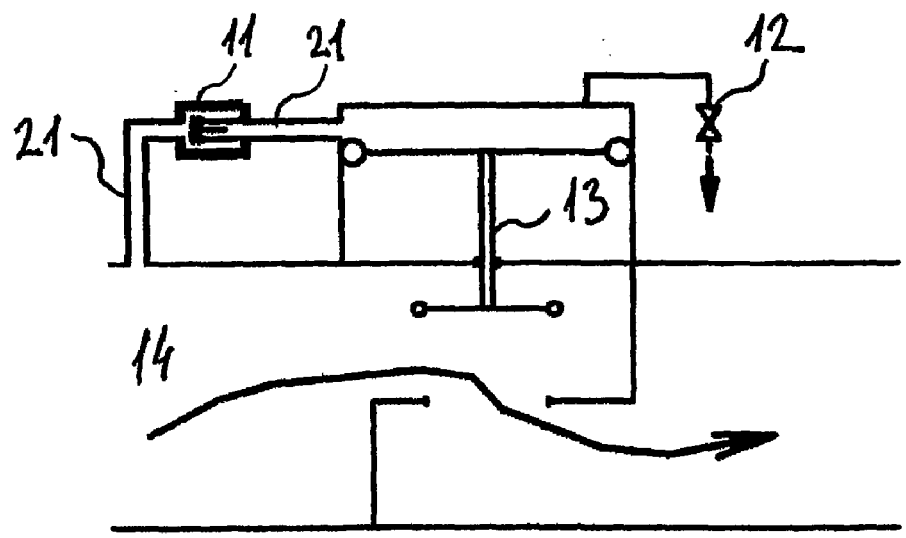
Figure 6C:
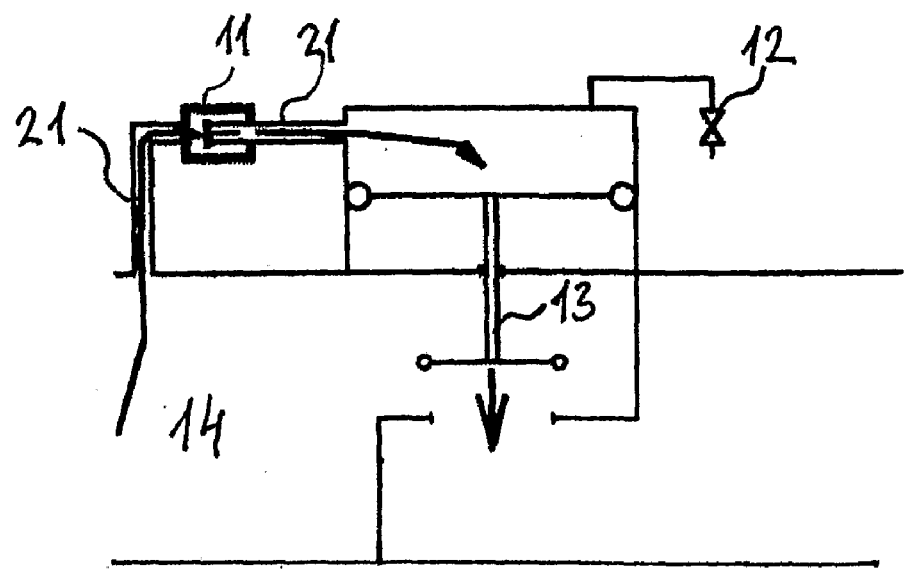
Figure 11A:
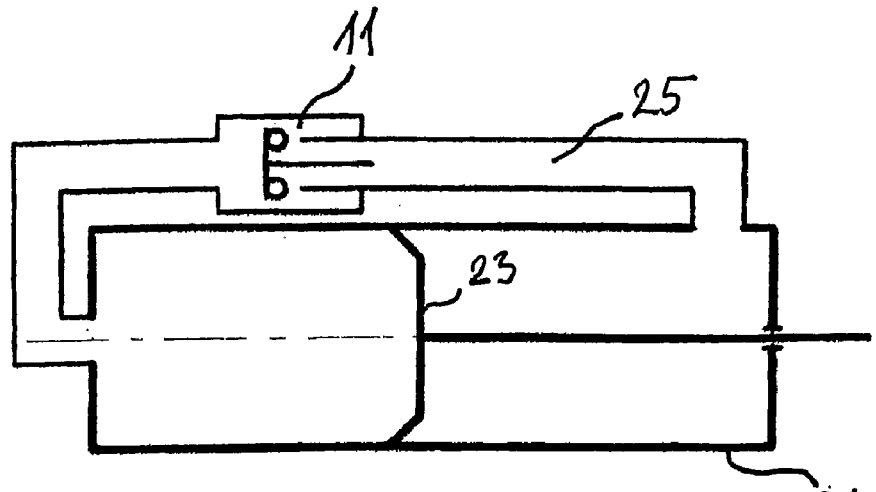
Figure 11B:
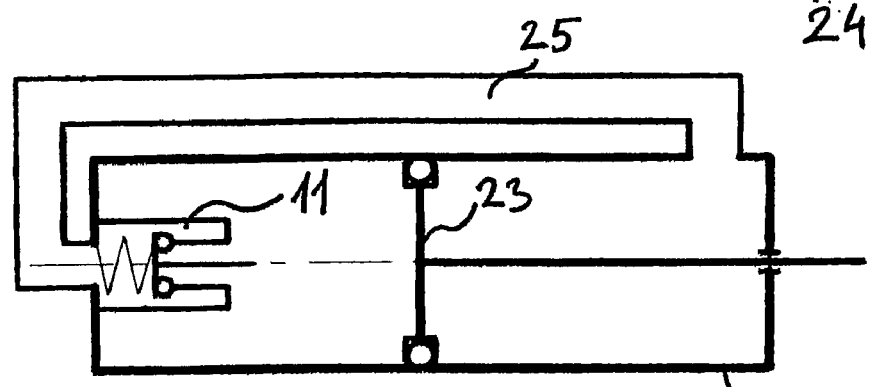
Figure 11C:
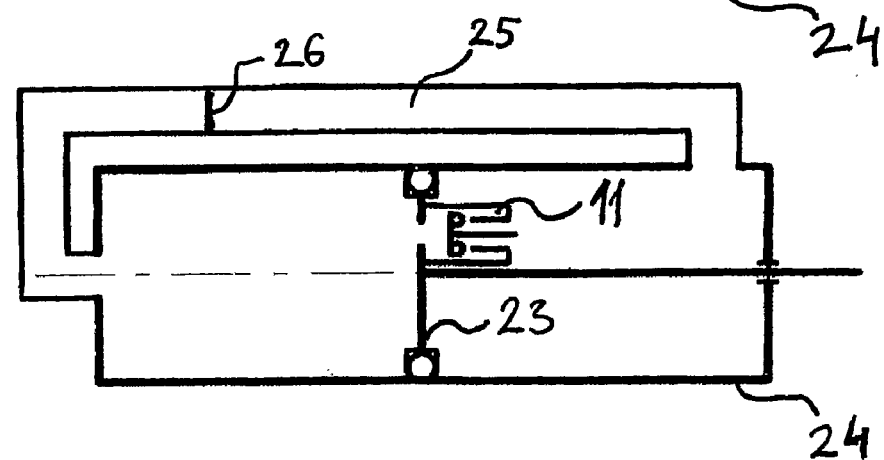

Exemplary embodiments of the invention will now be described in more details with reference to the accompanying drawings in which:

FIGS. 1A-C show the cross-sections of possible embodiments of the control valve provided with different damages according to the invention;

FIGS. 2A-C show the cross-sections of further possible embodiments of the control valve according to the invention provided with an elastic damage which narrows down when being under pressure;

FIGS. 3A-D show the cross-section of further possible embodiments of the control valve according to the invention;

FIGS. 4A-B are the cross-sections of a control valve according to the invention provided with a T-shaped control plug showing its two positions;

FIGS. 5A-C are the cross-sections of a control valve according to the invention provided with another T-shaped control plug showing its three positions;

FIGS. 6A-C show an arrangement for controlling the feeding of liquid where the control valve is placed outside the main flow path, illustrating three phases of operation;

FIGS. 7A-B show the cross-section of a control valve having a ball-shaped packing element illustrating its two positions;

FIGS. 8A-B show the plan view of the arrangement of FIG. 7 provided with one and three separate damages respectively, FIG. 9 shows the cross-section of the control valve of FIG. 7 where the packing element is cone-shaped, FIGS. 10A-B show the cross-section and plan view of a further possible control valve mechanism; and FIGS. 11A-C are schematic drawings of three different embodiments of a controlled damping arrangement using liquid or gaseous material.

Like elements in the figures are marked with the same reference numbers.

In FIG. 1 packing element 1 is placed in valve housing 2 so that it can move between second surface 4 formed in the valve housing and limiting member 6. When geometrically properly arranged, packing element 1 is not able to turn aside in the so formed limited space. First surface 3 of packing element 1 comes into contact with the second surface 4 of valve housing 2 as it is shown in FIGS. 1B and 1C. Then damages 5 shown in various forms in FIGS. 1A, 1B and 1C, ensure flow-through to a given extent between the contacting first surface 3 and second surface 4.

In FIG. 2A a similar packing element 1 can be seen, where damage 5 is formed in its first surface 3. In this case packing element 1 is formed from an elastic material. Damage 5 is formed as a radial or approximately radial through-pass channel. Due to the pressure difference existing on the two sides of packing element 1 this channel is able to become compressed, i.e. it narrows down. In FIGS. 2A, 2B and 2C increased pressures P1, P2 and P3 are applied from above by turns, thereby cross-sections A21, A22, A23 provided by damage 5 (in this case channel) narrow down respectively.

In FIG. 3A a packing element 1 formed as a plate can be seen which is able to move to a certain extent in the space bordered by limiting member 6. This displacement makes substantially unhampered flow-through when packing element 1 is in its upper position. When packing element 1 is in its lower position, it abuts against an annular supporting surface formed in the inner flange of the valve housing 2 and provided with damage 8. Damage 8 is different from the aforementioned damages 5 in that a steep notch is formed in an arched channel. The elastic packing element 1 is able to partially or entirely fill in the cross-section of the arched channel when pressure P2 or P3 is applied from above, but it is not able to fill in the steep notch. Naturally, the formations which can or can not be filled may be arranged separately from each other. Thereby cross-sections A21, A22, A23 are continually decreased, however, the smallest cross-section is greater than zero. This is shown in FIGS. 3B, 3C and 3D.

In FIGS. 4A and 4B two positions of a partly guided control plug with a T-shaped cross-section are shown containing an annular packing element 1, preferably an O-ring adjusted to its head part. In the inner wall of control plug 9 damages 5 are formed both on the head part and neck part. This damage 5 ensures a predetermined flow-through S4A beneath the packing element 1. When the arrangement is in closed state (FIG. 4A) only flow-through S4A is possible between valve housing 2 and packing element 1. In FIG. 4B control plug 9 moves away from packing element 1 as a result of force F applied externally, e.g. by means of a push button, maintenance rod, etc., and remains fixed to valve housing 2 due to flow-through S4B. In this state contamination stuck in damage 5 is able to move away together with the through flowing material, i.e. self-cleaning is ensured.

The embodiment shown in FIG. 5A is similar to that of shown in FIG. 4A, however, instead of forming damage 5 in the side wall of control plug 9, it is formed in the annular neck part of valve housing 2. In this manner a restricted flow-through S5A is ensured. Packing element 1 is fixed to control plug 9 so that it can not move. In this manner when force F is applied externally (by means of a push button, maintenance rod, etc.), packing element 1 moves away from damage 5 ensuring more extensive flow-through S5B which makes unhampered leaving of the accumulated contamination possible (FIG. 5B). In FIG. 5C moving of control plug 9 takes place due to pressure P originating from the reversed direction of flow. The double-tipped arrow indicates that flow-through S5C is more extensive then any of the previous ones, and contamination will surely get removed.

It is to be noted that control plug 9 may move as a result of gravitational force replacing force F of FIGS. 4 and 5. In this case the structure is arranged in a slanting direction as a result of which the control plug 9 having a greater specific weight than the liquid present in the space free from flow is able to move downwards. By choosing the effective specific weight of the control plug 9 and the direction of installation, self-control may be attained on the basis of gravitational force or lift force, i.e. change between the first and second position of the packing element 1 takes place as a result of these forces.

As it was mentioned earlier, the control valve function may be separated from the main flow path in certain cases. An example is shown in FIGS. 6A, 6B and 6C illustrating three stages of operation, namely a closed, an open and a half-open (before re-closing) state. In this arrangement a double piston 13 is placed in the main flow path 14. The common piston rod of the double piston 13 provided with a packing ring is able to move so that the smaller piston closes or opens the main flow path 14. The bigger piston which moves with the small one changes the cubic capacity of a closed space. This closed space is entirely filled with the material, in this case liquid. By opening controlled valve 12 the liquid is let out from the chamber. Refilling is performed by means of control valve 11 of the invention which is connected to the main flow path 14 through ducts 21. In this case asymmetric bidirectional flow is ensured by control valve 11. For example, if the closed space is emptied by means of controlled valve 12, double piston 13 takes up the position shown in FIG. 6B, and the space is refilled slowly from the main flow path 14 through control valve 11 which determines the flow velocity. When the smaller piston closes, the main flow path is blocked. Movement of double piston 13 approaching this state is shown in FIG. 6C.

Substantially similar arrangements may be used for shock absorbers and door controls. In these cases the control valve function can be separated from the main flow path as well. Examples of these will be shown later with reference to FIGS. 11A-C.

In FIG. 7A a control valve is seen where the packing element 15 is ball-shaped. Its outer surface represents the first surface. The counterpart of it is a funnel-shaped part of the valve housing 2 which represents the second surface and contains damage 5. In this case forming damage 5 on the surface of the ball is unreasonable, as the ball may turn away. However, for ensuring the necessary cross-section of flow in its closed position, homogenous roughening of the surface is possible. In the state shown in FIG. 7A the flow is substantially unhampered, while in FIG. 7B the state of restricted flow can be seen. Naturally, formations different from the funnel-shaped one are also feasible.

In FIG. 8A the ball-shaped packing element 15 and the second surface 16 provided with radial damage 5 are shown from above. If several e.g. three damages 5 are formed equidistant from one another, the flow-through capacity in the closed i.e. second position may be increased. This can be seen in FIG. 8B.

In FIG. 9 a packing element 17 having the shape of a cone can be seen. The other component parts are the same as described with reference to FIGS. 7A and 7B.

In FIG. 10A an arrangement similar to that of shown in FIG. 4 can be seen but here the first and second surfaces do not come apart during the operating cycle of the control valve. In this case the possibility for self-cleaning which is a main advantage of the present invention is not ensured. However, this arrangement is composed of two parts in such a manner that the first and second surfaces can be parted during servicing or maintenance even without disassembling the arrangement. A concentric packing element 18 is fixed to the neck part 22 of valve body 20. Packing element 18 has a conoidal flexible flange 19. This flexible flange 19 is pressed close against valve housing 2 when pressure in the upper space is higher than in the lower space. Reversely, when the pressure is higher from below, the flexible flange 19 bends inwards, towards the centre point of valve body 20, thereby material flow becomes possible. Second surface 4 is formed on the neck part of valve body 20 while the inner and lower surface of packing element 18 represents the first surface 3. Damages 5 which make downward flow of material possible are formed on one of these surfaces, preferably on the neck part 22 of valve body 20. FIG. 10B shows the same arrangement from above. During maintenance by moving valve body 20 axially, in a similar manner as it is shown in FIG. 4, packing element 18 may be brought into different positions longitudinally along neck part 22. In this way cleaning is accomplished.

The embodiments shown in FIGS. 11A-C may be used for shock absorbers, door controls and similar devices. A main piston 23 moves in a cylinder 24 filled with gaseous or liquid material which is able to flow through a feedback path 25 between the spaces adjacent to the front end and back end of the piston 23. The velocity at which piston 23 moves in the two directions must be significantly different. In FIG. 11A control valve 11 according to the invention is located in feedback path 25. In FIG. 11B the control valve is placed in one of the end portions of cylinder 24. Finally, in the embodiment of FIG. 11C the relatively small control valve 11 is installed in the main piston 23, in which case the feedback path 25 must be blocked by a closing member 26. As feedback path 25 is not used here, closing member 26 can be omitted.

The system is capable of self-cleaning due to the difference in the specific weight of the component parts (for example ball 15 and the flowing material e.g. water) or the system may also be made self-cleaning by proper installation, after the pressure difference between the two sides is compensated.

The control valve according to the invention is simple, reliable and may be used for several purposes.

The invention claimed is:

1. A control valve with profiled packing element for making bidirectional flow-through with asymmetric intensity possible in a flow area, the packing element having a first surface which can be abutted against a second surface formed within the valve housing, said packing element having a first position in which said first surface and said second surface abut against one another, and a second position in which said first surface and said second surface are distant from one another; characterized in that at least one of the surfaces from said first surface of said packing element and said second surface within said valve housing is provided with a damage by means of which when said packing element is in its first position a first cross-section of flow is ensured between said abutting first and second surfaces, said first cross-section of flow being smaller than a second cross-section of flow ensured by said packing element when it is in its second position, and one of said first and second surfaces being a hard surface formed from metal, plastic or ceramic material, the other being formed from plastic, rubber or other elastic material, wherein the compressed elastic material is narrowing down said damage due to a pressure difference on the two sides of the packing element in its first position and wherein the transition between said first and second position of said profiled packing element is ensured on the basis of pressure difference and gravitational or lifting force by means of a control plug fastened thereto, by suitably selecting the specific weight of said control plug relative to the flowing.

2. The control valve according to claim 1 characterized in that said profiled packing element is disc-shaped.

3. The control valve according to claim 1 characterized in that said profiled packing element is cone-shaped or O-shaped.

4. The control valve according to claim 1 characterized in that said profiled packing element is ball-shaped and said second surface funnel-shaped.

5. The control valve according to claim 1 characterized in that it is positioned outside the main flow path for controlling the flow-through of said main flow path.

6. The control valve according to claim 4 characterized in that it communicates with said main flow path through ducts.

7. The control valve according to any one of claims 1-6, wherein said first cross-section of flow is orders of magnitude smaller than said second cross-section of flow.

8. A control valve with profiled packing element for making bidirectional flow-through with asymmetric intensity possible in a flow area, the packing element having a first surface which can be abutted against a second surface formed within the valve housing, said packing element having a first position in which said first surface and said second surface abut against one another, and a second position in which said first surface and said second surface are distant from one another; characterized in that at least one of the surfaces from said first surface of said packing element and said second surface within said valve housing is provided with a damage by means of which when said packing element is in its first position a first cross-section of flow is ensured between said abutting first and second surfaces, said first cross-section of flow being smaller than a second cross-section of flow ensured by said packing element when it is in its second position, and one of said first and second surfaces being a hard surface formed from metal, plastic or ceramic material, the other being formed from plastic, rubber or other elastic material, wherein the compressed elastic material is narrowing down said damage due to a pressure difference on the two sides of the packing element in its first position wherein during its operating cycles said packing element takes up only its first position ensuring said first cross-section of flow, and it can be brought into its second position by means of a maintenance aid or servicing and wherein said control valve further contains a oneway valve arranged parallel with the first cross-section of flow ensured by the packing element, and during the operating cycles of the control valve, depending on the direction of flow, either an entirely closed cross-section of flow or a third cross-section of flow is ensured, the third cross-section of flow being orders of magnitude larger then the first cross-section of flow.

\* \* \* \* \*